United States Patent Office 2,886,445
Patented May 12, 1959

2,886,445
PROCESS FOR MAKING CHEWING GUM AND PRODUCT

Harold Rosenthal, Newtonville, Franklin Kramer, Lexington, Ernst Albert Steigmann, Winchester, and Arthur F. Tole, Melrose, Mass., assignors to General Foods Corporation, White Plains, N.Y., a corporation of Delaware No Drawing. Application December 8, 1958
Serial No. 778,600

12 Claims. (Cl. 99—135)

This invention relates to an improved flavoring composition particularly adapted for use in chewing gum and to a process for preparing the same. More particularly it relates to a chewing gum having a flavor which is controllably released over an extended period of time and to a process for preparing the same.

Chewing gum may comprise a substantially water-insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; volatile, water-immiscible flavoring agents e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccharin. Other optional ingredients may also be present.

It is found that when most flavored chewing gums, such as slab gums, are chewed, the initial perception of flavor appears after a minute or more at a low level, and after three or four minutes of chewing, the flavor intensity drops to an uninteresting low level. It is also found upon analysis that gum chewed for as long as 30 minutes may ultimately retain as much as 60% of the flavor initially present, and that this proportion of the flavoring agent is thus not effectively used.

It is an object of this invention to provide a flavoring composition, particularly adapted for use in chewing gum, which composition is characterized by an extended period of controlled flavor release. A second object of this invention is to increase the total amount of flavor released during the chewing period of gums containing the herein described flavoring composition. Other objects of this invention will be apparent to those skilled-in-the-art from the following detailed description of the invention.

It has now been discovered that it is possible to obtain a flavoring composition, particularly adapted for use in chewing gum which permits attainment of a product characterized by extended flavor perception time, true flavor character, and release of a large proportion of flavoring agent. This flavoring composition comprises finely divided particles of a dried hardened gelatin emulsion containing discrete micro-droplets of a volatile, water-immiscible flavoring agent. Preparation of the flavoring composition of this invention may be effected by encapsulating discrete micro-droplets of volatile, water-immiscible flavoring agent within finely divided particles of a dried emulsion of hardened gelatin.

Unhardened gelatins which, when hardened, may be employed in this invention include any of the edible grades of gelatin typified by those obtained from e.g. tanner's stock, ossein, pigskin, etc. The Bloom of the unhardened gelatin may vary widely, but it is preferred to use gelatins having a low Bloom of 20 to 80, preferably 50. The pH of a typical unhardened gelatin which may be employed may be 4 to 10. It is a feature of this invention that, although a tunnel-dried gelatin will preferably be employed, it is possible to use gelatin from a wide variety of sources e.g. spray-dried gelatin, a drum-dried gelatin, etc.

Hardening of the unhardened gelatins to attain the desired degree of hardness preferred in connection with the process of this invention may be accomplished by either physical or chemical means. Typical of the physical techniques which may be employed is exposure of a dried gelatin emulsion to heat, preferably at temperature sufficiently low to minimize loss of flavor by volatilization. Hardening by heat treatment may be effected for example by placing the gelatin (preferably in particle form) containing the flavoring agent in an autoclave for 30 minutes at 5 p.s.i.g. and 110° C.

When the gelatin is to be hardened by chemical treatment, this may be effected by treatment of the gelatin either in sol form or in gel form with treating agents including those hereinafter noted. Certain agents, e.g. diacetyl, may be used in gas phase to contact the solidified gelatin. Preferably however, the hardening agent will be added to the gelatin solution before the same is dried.

Chemical hardening agents which may be employed may be those embraced within the following groups:

I. Aromatic hardening agents, including (a) anionic (b) amphoteric, and (c) cationic;
II. Aliphatic hardening agents;
III Resin-type hardening agents;
IV. Carbonyl-type hardening agents;
V. Mineral hardening agents;
VI. Salting-out agents;
VII. Gelatin modifying agents.

GROUP I

I. (a) *Aromatic hardeners.*—Anionic materials within this group may include natural tanning agents, e.g. quebracho, sumach, or tannic acid; sulfonated organic compounds e.g. including lignin sulfonic acid or polyaryl sulfonamides (typically available under the trade name "Tannigan Supra LL"); phenols (preferably when freshly precipitated by acids from their phenates in presence of the gelatin to be hardened) e.g. p-chlorometacresol or methyl salicylate (the latter preferably in colloidal form following precipitation from its phenate); or condensation products typified by the phenolsulfonic acid-formaldehyde condensation product.

I. (b) Amphoteric materials within this group may include phenol-formaldehyde-amine condensation products such as those obtained by a Mannich condensation between resorcinol, formaldehyde, and an aliphatic base. A typical material of this nature may have a structural formula as follows:

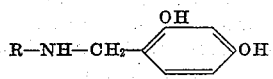

where R is preferably an aliphatic residue, e.g. —$CH_3$ or a gelatin residue.

I. (c) Cationic materials within this group may include resins such as aniline-formaldehyde resins which may have been heat treated at e.g. 170° C. and then diazotized and coupled to azo dyes.

GROUP II

Aliphatic hardeners within this group may include aliphatic-type compounds including diepoxides or epichlorhydrin; paraffin sulfochlorides; and alkyl sulfates or sulfonates including wetting agents such as dodecyl sulfonate (the latter typically available under the trade name Duponol C).

GROUP III

Resin hardeners within this group may include formaldehyde-type resins such as the dicyandiamide-formaldehyde resins, urea-formaldehyde condensation products, melamine-formaldehyde condensation products, and di-isocyanates, e.g. hexamethylene-di-isocyanate, the latter preferably unpolymerized or only very slightly polymerized.

GROUP IV

Carbonyl hardeners within this group may include aldehydes and ketones, e.g. quinones. Preferred among the members of this group are formaldehyde or formaldehyde-releasing agents including hexamethylene tetramine. Other effective aldehyde hardeners include alkyl homologues of formaldehyde including acetaldehyde, propionaldehyde, butyraldehyde, etc., preferably in alkaline solution; hydroxy-aldehydes, e.g. glycol aldehyde, aldol, glyceric aldehyde, and alpha hydroxy adipaldehyde; dialdehydes, e.g. glyoxal methylglyoxal, p-glyoxal, and mesoxy-dialdehyde; unsaturated aliphatic aldehydes, e.g. acrolein, dibromacrolein, and crotonic aldehyde; carboxylic aldehydes including glyoxylic acid, etc.; aromatic aldehydes including salicylic aldehydes and resorcylic aldehyde; and methylene citric acid.

Typical of suitable ketones which may be employed are acetol, fructose, alpha diketones, e.g. diacetal (which forms xyloquinone above pH 7), quinones, or 1,4-diketones, e.g. acetonyl acetone.

GROUP V

Mineral hardeners within this group may include polysilicic acids, e.g. colloidal silica; or salts typified by alum, chrome alum, basic zirconyl sulfate, iron salts including ferrous-sulfate (when iron salts are used, they are preferably added as ferrous salts to the getalin solution and oxidized in situ as by hydrogen peroxide to ferric iron).

GROUP VI

Salting-out agents which may be used are typified by citrates, sulfates, and glycine. Typical of these is sodium sulfate.

GROUP VII

Included within this group are modifying agents which may be employed to produce modified gelatins, e.g., the phenate, alkylsulfate, polyacrylate, polysilicate, polystyrene sulfonate, or the chitosan hydrochloride of gelatin as well as acylated and sulfonylated gelatins including benzene sulfonyl gelatin (which is soluble at pH above the isoelectric point and insoluble at or below the isoelectric point).

Hardening of gelatin to effect the desired results of this invention may preferably be done while the gelatin is in solution. Typically hardening may be accomplished by forming a solution of 15% to 50%, preferably 40% of gelatin in water and treating this solution with hardening agent in the amount of 0.5% to 5%, preferably 1% by weight of gelatin present. When hexamethylene tetramine is the hardening agent, it will be used in amount of 0.5%–5%, preferably 1% by weight of gelatin; when acetaldehyde is the hardening agent, it will be used in amount of 0.1%–1%; and when formaldehyde (in 37% aqueous solution) is employed, it will be used in amount of 0.05% to 0.5%. Hardening occurs during a period of 10 minutes to 30 minutes, preferably 20 minutes at temperature of 100° F. to 120° F., preferably 110° F. Agitation may be provided during the hardening process.

When the gelatin to be hardened is in solution, as is the case in the preferred procedure, hardening is conducted to a point just short of precipitation, i.e., if more hardening agent were added, the gelatin would be hardened to the point where it is insoluble. During the hardening process, the molecules of gelatin may become cross-linked, the molecular weight and viscosity increase, and the rate of solubility of the gelatin decreases.

The hardened gelatin may be designated generally by the term "gelatin-hardening agent" and specifically by a name which indicates the particular hardening agent employed, e.g., "gelatin-hexamethylene tetramine." This designation does not necessarily imply that any particular compound is formed during hardening, nor does it imply that the hardening agent so-designated is necessarily found as such in the hardened gelatin.

Prior to the solidification or drying of the gelatin solution and preferably before hardening but after cooling the same to 80° F. to 140° F., preferably 110° F., the desired volatile, water-immiscible flavoring agent may be added to the solution to form an emulsion which may then be homogenized. Typically the flavoring materials which may be employed include oil of peppermint, oil of spearmint, fruit essences, licorice, spice oils and the like. The selected flavoring material may be added in amount of 10% to 50%, preferably 33% by weight of the gelatin.

The emulsion of flavoring agent in gelatin solution may be dried by any one of a wide variety of techniques. For example, it is possible to dry this material by spray-drying, drum drying, foam-drying or by tunnel-drying. In the preferred embodiment of this invention, tunnel-drying will be employed.

When the emulsion of flavoring agent in gelatin solution is solidified as by cooling and subsequent drying, the resultant dried emulsion flavoring composition has the flavoring agent distributed therewithin in the form of discrete micro-droplets. The solid dried emulsion will be reduced to powder form which may typically be 20 mesh to 400 mesh, preferably 80 mesh. The resultant flavoring composition comprises particles of dried hardened gelatin distributed within each of which is a volatile, water-immiscible flavoring agent in the form of discrete micro-droplets. The flavoring composition thus comprises flavoring agent encapsulated or locked within solid hardened gelatin. Typically the flavoring composition may contain 50% to 90%, preferably 67% of hardened gelatin, and 10% to 50%, preferably 33% of volatile, water-insoluble flavoring agent.

Compounding of a flavored chewing gum may be effected by admixing the hardened gelatin-encapsulated flavoring composition in amount of 3% to 30%, preferably 15%, with the gum base in amount of 70% to 97%, preferably 85% by weight. Preferably unfixed flavor will also be present in amount greater than the amount of flavor in fixed form. Mixing may be effected by suitable mechanical mixing procedures for time sufficient to produce a uniform mixture. The mixed gum may then be extruded to desired shape.

Physically the resulting chewing gum product may include an all-enveloping mass of gum base such as chicle, within which is substantially uniformly distributed particles of hardened gelatin-encapsulated flavor. Although the mixing procedure followed may result in transfer of some of the flavoring agent from the hardened gelatin encapsulation to the gum, substantially all of the flavoring agent which was admitted will still be found in the hardened gelatin-encapsulation after mixing. Other ingredients including sweetening agents, coloring agents, etc. may also be present in desired amount.

It is a characteristic feature of this chewing gum product composition that it retains its flavor under conditions of vigorous chewing for extended periods which may be double that of compositions heretofore known. For example, under certain conditions, the flavor perception time may be six minutes or longer, in contrast to the usual three minutes which is the flavor perception time of products heretofore known to those skilled-in-the-art.

The chewing gum product is also characterized by high degree of flavor release. It may retain as little as 30%–

35% of the flavor originally present after chewing for 30 minutes. Gums heretofore available, when chewed for the same time, are found to retain as much as 60% or more of the flavor originally present.

The following specific examples will serve to illustrate certain preferred embodiments of this invention.

*Example I*

According to a specific example of the preferred embodiment of the process of this invention, 40 parts by weight of 50 Bloom gelatin were added to 60 parts by weight of water at temperature of 40° F. The mixture was agitated and heated to 140° F. until the gelatin completely dissolved and then the solution was cooled to 120° F. 20 parts by weight of methyl salicylate (oil of wintergreen) was added to the solution which was homogenized to form an emulsion.

0.4 part by weight of hexamethylene tetramine was added to the homogenized emulsion, and the mixture was maintained at 110° F. for 20 minutes. The resulting emulsion which formed was chilled and dried with circulating air at room temperature.

100 parts by weight of chicle were admixed with 18 parts by weight of the above-prepared hardened gelatin-encapsulated flavor and the mixture blended until homogeneous.

Testing of the product chewing gum indicated that it had a substantially high flavor release. Perceptible flavor was apparent during chewing over a period of 9 minutes. Flavor retention was 35% after 30 minutes of chewing.

*Example II*

According to a specific example of the process of this invention, 40 parts by weight of 50 Bloom gelatin were added to 60 parts by weight of water at temperature of 40° F. The pH was adjusted to 9 by addition of caustic soda solution. The mixture was agitated and heated to 140° F. until the gelatin completely dissolved and then the solution was cooled to 120° F. 20 parts by weight of methyl salicylate (oil of wintergreen) was added to the solution which was homogenized to form an emulsion.

0.75 part by weight of acetaldehyde was added to the homogenized emulsion, and the mixture was maintained at 110° F. for 20 minutes. The resulting emulsion which formed was drum-dried.

100 parts by weight of chicle were admixed with 18 parts by weight of the above-prepared hardened gelatin-encapsulated flavor and the mixture blended until homogeneous.

Testing of this product chewing gum indicated that it was characterized by low flavor retention after chewing and by an extended period of flavor release.

*Example III*

According to a specific example of the process of this invention, 40 parts by weight of 50 Bloom gelatin were added to 60 parts by weight of water at temperature of 40° F. The pH was adjusted to 9 by addition of caustic soda solution. The mixture was agitated and heated to 140° F. until the gelatin completely dissolved and then the solution was cooled to 120° F. 20 parts by weight of methyl salicylate (oil of wintergreen) was added to the solution which was homogenized to form an emulsion.

0.3 part by weight of formaldehyde was added to the homogenized emulsion, and the mixture was maintained at 110° F. for 20 minutes. The resulting emulsion which formed was spray-dried.

100 parts by weight of chicle were admixed with 18 parts by weight of the above-prepared hardened gelatin-encapsulated flavor and the mixture blended until homogeneous.

Testing of this product chewing gum indicated that it was characterized by low flavor retention after chewing and by an extended period of flavor release.

A typical product prepared according to this invention may have the following composition:

*Example IV*

| Component: | Parts by weight |
|---|---|
| Chicle | 100 |
| Gelatin | 12 |
| Hardening agent (hexamethylene tetramine) | 0.1 |
| Oil of wintergreen | 6 |

A taste test was made to compare a chewing gum product of this invention with a standard chewing gum containing the same total amount of flavor in unfixed form. During the tests, 0.5×0.75×0.0625 inch slabs of each gum were separately chewed and the following were noted: time and intensity of initial flavor perception, extent of flavor burst, duration of interesting flavor level, and approximate total time during which flavor was available. In these tests, the rating of flavor intensity was measured by the person chewing, on a scale ranging from 0 to 10, the level of 1 indicating the threshold flavor intensity just discernable to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

Initial flavor liberation in a sample prepared according to this invention occurred at level of 1 after 5 seconds. Intensity continuously rose to a high of about 10 after 90 seconds. It remained at this level until about 3 minutes when it dropped off slightly. After 4 minutes, it was at level of 7.5 which was higher than that reached by the standard gum at any time. Flavor was very apparent for total time of about 9 minutes at which point the intensity had dropped to the threshold value of 1. During the entire period, the flavor was rich and full-bodied and substantially true in character.

For ease of comparison, the results of the taste tests are presented in tabular form:

| Time | Standard | Example I |
|---|---|---|
| 5 Seconds | | 1 |
| 7 Seconds | 1 | |
| 10 Seconds | 2 | 2 |
| 15 Seconds | 3 | 3 |
| 20 Seconds | 4 | 4 |
| 30 Seconds | 5 | 6 |
| 45 Seconds | | 7 |
| 60 Seconds | 6 | 8 |
| 90 Seconds | 3 | 10 |
| 2 Minutes | 1.5 | 10 |
| 3 Minutes | 1 | 10 |
| 4 Minutes | 1 | 7.5 |
| 5 Minutes | | 5 |
| 6 Minutes | | 3 |
| 7 Minutes | | 2 |
| 8 Minutes | | 2 |
| 9 Minutes | | 1 |

It is apparent to the person making the chewing test that the chewing gum product of this invention is superior to the sample containing the same amount of flavoring oil in unfixed form. Specifically the product of this invention is characterized by an extended flavor perception time, a true flavor character which is substantially that of the flavoring agent, and a high degree of flavor release.

The term "encapsulate" as herein employed with reference to the relation of the hardened gelatin and the flavoring agent means that the latter is distributed substantially homogeneously within a solid mass of the former. The flavoring agent is locked in within the hardened gelatin to the extent the former is released as the hardened gelatin is dissolved from the surface of the individual hardened gelatin particles by the action of salivary liquids.

Although the specific examples herein described show certain details of my invention including, for example, specific techniques according to which gelatin may be hardened, it will be apparent to those skilled-in-the-art that there are other techniques for hardening gelatin which may be employed in connection with this invention and that various modifications and changes may be made which come within the scope of this invention.

This application is a continuation-in-part of application Serial No. 604,089, of the same inventors, filed August 15, 1956, entitled Product and Process.

What is claimed is:

1. A chewing gum which comprises particles of a dried emulsion of hardened gelatin-hardening agent, discrete micro-droplets of a volatile, water-immiscible flavoring agent within each of said particles, and an all-enveloping mass of a chewable gum base within which the particles are substantially uniformly distributed.

2. A chewing gum as claimed in claim 1 wherein said hardening agent is a carbonyl-type hardening agent.

3. A chewing gum as claimed in claim 1 wherein said hardening agent is a gelatin modifying agent.

4. A chewing gum as claimed in claim 1 wherein said hardening agent is a gelatin salting-out agent.

5. A chewing gum as claimed in claim 1 wherein said hardening agent is a mineral type hardening agent.

6. A chewing gum as claimed in claim 1 wherein said hardening agent is an aliphatic type hardening agent.

7. A chewing gum comprising 3%–30% of particles of a dried emulsion of hardened gelatin containing discrete micro-droplets of a volatile water-immiscible flavoring agent within each of said particles, and 70%–97% of an all-enveloping mass of a chewable gum base within which the particles are substantially uniformly distributed.

8. A chewing gum which comprises particles of a dried emulsion of hardened low Bloom gelatin, discrete micro-droplets of a volatile, water-immiscible flavoring agent within each of said particles, and an all-enveloping mass of a chewable gum base within which the particles are substantially uniformly distributed.

9. A chewing gum as claimed in claim 8 wherein said gelatin has a Bloom of 20–80.

10. A chewing gum which comprises particles of a dried emulsion of physically hardened gelatin, discrete micro-droplets of a volatile, water-immiscible flavoring agent within each of said particles, and an all-enveloping mass of a chewable gum base within which the particles are substantially uniformly distributed.

11. The method of preparing a chewing gum which comprises forming a gelatin solution, drying said gelatin solution to form a dried emulsion containing gelatin, adding a volatile water-immiscible flavoring agent to said gelatin before the same is dried whereby the flavoring agent is encapsulated within the gelatin, hardening said gelatin within which the said flavoring agent is encapsulated, and substantially uniformly distributing the said dried emulsion of hardened gelatin containing the encapsulated flavor within an all-enveloping mass of a chewable gum base.

12. The method of preparing a chewing gum which comprises forming a gelatin solution, hardening said gelatin, drying said hardened gelatin, adding a volatile water-immiscible flavoring agent to said gelatin before the same is hardened and dried whereby the flavoring agent is encapsulated within the gelatin and substantially uniformly distributing the said dried emulsion of hardened gelatin containing the encapsulated flavor within an all-enveloping mass of a chewable gum base.

References Cited in the file of this patent

UNITED STATES PATENTS

| | | |
|---|---|---|
| 748,708 | Dunham | Jan. 5, 1904 |
| 1,526,039 | Arkell et al. | Feb. 10, 1925 |
| 2,369,847 | Olsen et al. | Feb. 20, 1945 |
| 2,680,075 | Landau | June 1, 1954 |